(12) United States Patent
Kumar et al.

(10) Patent No.: US 6,342,906 B1
(45) Date of Patent: Jan. 29, 2002

(54) ANNOTATION LAYER FOR SYNCHRONOUS COLLABORATION

(75) Inventors: Suresh Kumar; Pradeep Varma, both of New Delhi (IN)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/243,084

(22) Filed: Feb. 2, 1999

(51) Int. Cl.[7] .................................................. G06F 3/00
(52) U.S. Cl. ...................... 345/751; 345/753; 345/764; 345/759; 707/512; 709/201; 709/204
(58) Field of Search ................................. 345/330, 331, 345/332, 329, 339, 435, 751, 753, 759, 764; 707/512; 709/201, 204, 205

(56) References Cited

U.S. PATENT DOCUMENTS

| 5,600,775 A | * | 2/1997 | King et al. .................. 395/806 |
| 5,761,419 A | * | 6/1998 | Schwartz et al. ...... 395/200.34 |
| 5,819,038 A | * | 10/1998 | Carleton et al. ....... 395/200.34 |
| 5,920,694 A | * | 7/1999 | Carleton et al. ....... 395/200.35 |
| 6,008,804 A | * | 12/1999 | Pommier et al. ........... 345/340 |
| 6,240,444 B1 | * | 5/2001 | Fin et al. .................... 709/205 |

* cited by examiner

Primary Examiner—Raymond J. Bayerl
Assistant Examiner—Cuong T. Thai
(74) Attorney, Agent, or Firm—McGuireWoods, LLP; Stephen C. Kaufman (57) ABSTRACT

Effective real-time collaboration across remote sites in which any type of data can be shared in a common work space in a consistent manner is made possible by an annotation layer having multiple distinct modes of operation during a collaborative session with two or more people sharing the same work space. One mode is a discussion mode in which one or more users simply share a common view of the shared data and manipulate the view independent of the shared data. During the discussion mode, all user input is handled by the annotation layer which interprets user inputs to move common cursors, create, move or delete markings and text which, since the annotation layer is transparent, appear over the application. Another mode is an edit mode in which one or more users actually edit the shared data. The applications and the data are synchronized among all clients to display the same view. Manipulating the view includes moving a common cursor and placing markings on the common view using text and/or drawing tools.

27 Claims, 7 Drawing Sheets

ANNOTATION LAYER FOR SYNCHRONOUS COLLABORATION

BACKGROUND OF THE INVENTION

1. Field of the Invention

The present invention generally relates to collaborative work by a plurality of participants using computers connected together via a network and, more particularly, to a consistent, real-time collaboration environment in which any type of data can be shared by the participants in a common work space.

2. Background Description

With the spread of the Internet and intranets, collaboration between persons and teams across remote sites is increasing. Collaboration tools can be divided into asynchronous and synchronous tools. Groupware, such as Lotus Notes and Microsoft Exchange, and discussion groups on a network where the data is changed batchwise are asynchronous tools. These do not require, nor do they take advantage of, simultaneous presence of many users in the environment. On the other hand, new sets of tools such as chat, whiteboards and more sophisticated environments, such as Same Time, allow for groups to interact simultaneously. These tools allow users and groups to work in a common work space at the same time in a synchronous, real-time fashion. Changes to the shared work space are made visible to all participants immediately.

Currently, synchronous tools are quite restrictive in the types of data that can be shared in the common work space. The work space for chat programs is a common text file which serves as a conversation log. The work space for whiteboards is a shared bitmap image. If a group wants to include, say, a spreadsheet in a discussion through a whiteboard, then they have to share the bitmap image of the spreadsheet and modify local copies of the spreadsheet manually in order to maintain synchrony between spreadsheet copies and the spreadsheet image in the collaborative discussion in the whiteboard. It has recently become possible to directly modify work spaces such as spreadsheets in real-time collaboration wherein synchrony in the work spaces is maintained automatically. However, these mechanisms tend to be work space specific and do not provide a general method for discussion all kinds of work spaces in real-time collaboration.

SUMMARY OF THE INVENTION

It is therefore an object of the present invention to provide effective real-time collaboration across remote sites in which any type of data can be shared in a common work space in a consistent manner.

According to the invention, there is provided a method for the standardized viewing, discussion, marking, and expert modification of all kinds of work spaces in real-time collaboration sessions. The method comprises a user interface based on a transparent annotation layer that can be built into any real-time collaboration system. The resulting collaboration system continues to work with all the work spaces that it could previously work with. The difference is that now it provides a transparent wrapper, called an annotation layer, through which participants view their work space.

By viewing the work space through the transparent wrapper, participants can mark or annotate the work space through the transparent wrapper. This does not modify the work space itself, doing which may require work space-specific expertise on the part of the participants. The markings allowed on the wrapper can be extensive, indeed much more than what is possible within the work space viewed through the wrapper. For example, the wrapper may allow circling parts of tables in a spreadsheet, writing on top of tables, and shading multiple regions in an ordinary text document. Participants with no expertise in any particular work space can take part in a collaboration session by working solely with the annotation layer and letting others deal with the expert details of modifying the work space itself.

At the option of the participants, the annotation layer can be synchronized with the work space underneath or it can be left unsynchronized. When the annotation layer is synchronized, then scrolling the annotation layer causes scrolling of the work space and vice versa. Expanding the work space by adding data to it also expands the annotation layer in the corresponding regions. Reducing the work space by deleting data from it also truncates the annotation layer in the corresponding regions, and so on. When the annotation layer is left unsynchronized, then scrolling the work space does not scroll the annotation layer, and modifying the work space does not correspondingly modify the annotation layer. Asynchrony between an annotation layer and the work space underneath can let the annotation layer serve as a static filter through which the work space can be seen in whole or in part. For example, participants may want to treat the annotation layer as a fixed-size, unmoving slide through which they view the work space as they scroll the work space.

Each participant may be allowed to choose to work with the annotation layer or with the work space underneath by specifying a mode of operation for himself or herself. In discussion mode, a participant can mark the annotation layer, move shared cursor(s), and change the view by scrolling or by going to a different part of the annotation layer. At the option of the participant, the work space can be visible through the transparent layer, or it can be invisible in this mode.

A participant cannot modify the shared work space while in the discussion mode. Edit mode provides a way for participants to expertly make work space modifications. Edit mode requires work space-specific expertise from a participant; that is, the participant has to know how to manipulate and/or modify the individual work space. At the option of the participant, the covering annotation layer can be visible or invisible in the edit mode. In both edit and discussion modes, the transparent layer and the work space underneath can be made synchronized or unsynchronized. The mode of any participant can be decided and/or changed by the participant alone, and/or by other participants. The participants with authority to control/restrict/change other participants' modes can be a subset of the participants in the collaboration session. The subset can be changed through the collaboration session. Control over a participant's mode is also control over the participant's ability to read/write the shared work space. Any participant who has been granted the edit mode can write to the shared work space while any participant who has been restricted to the discussion mode can at most only read the shared work space.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
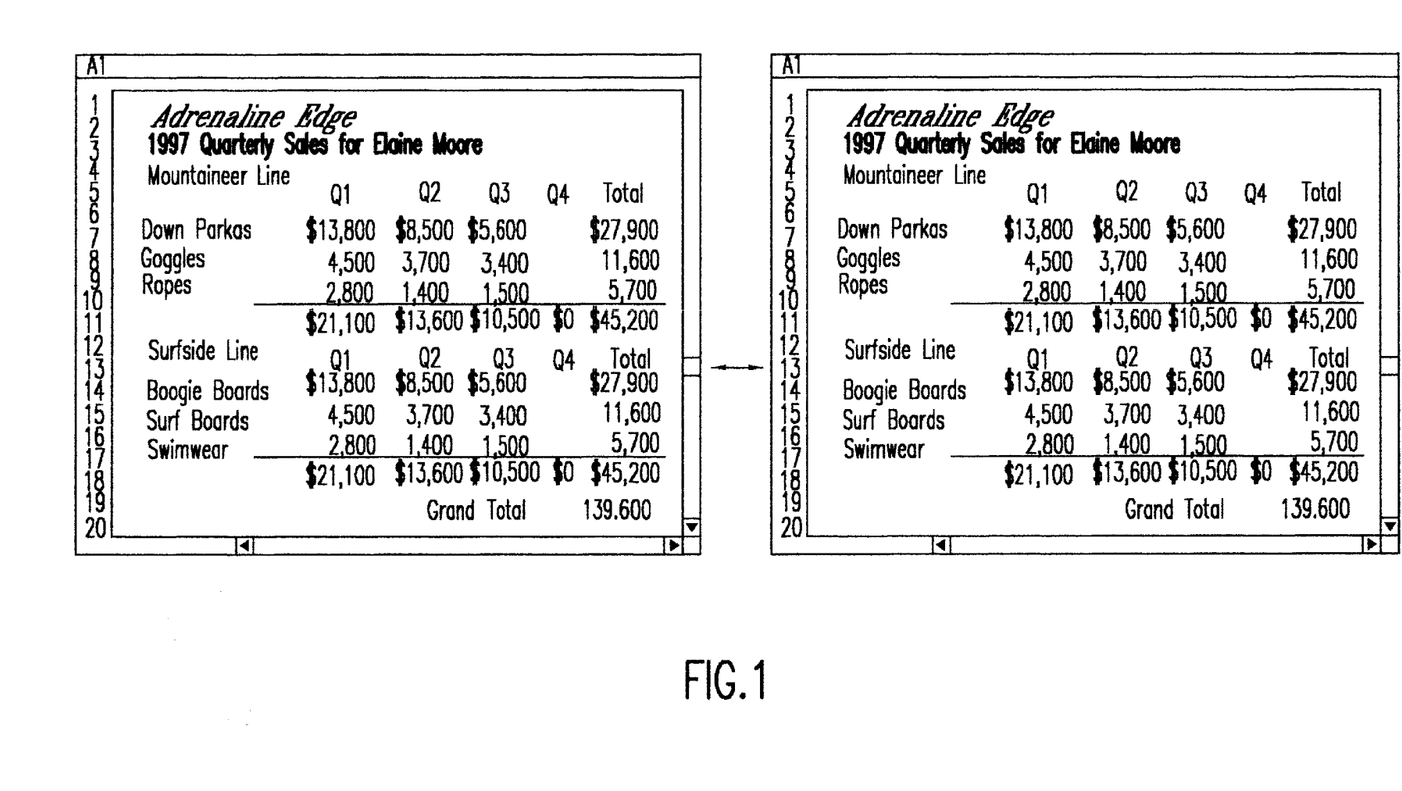
FIG. 1 is an illustration of two screens illustrating a real-time collaboration example in which two clients are synchronized on the same shared work space, in this case a spreadsheet.

Referring now to the drawings, and more particularly to FIG. 1, there is shown two screens of displays on different clients in which synchronized applications display data from a shared work space. The work space in the example illustrated is a spreadsheet. The same display is presented to each client since the applications are synchronized. That is, if data is changed or edited in one application on one client, the data will be updated in the application on the other client so that participants in the collaborative effort will see the same data.

The invention provides a mechanism for a consistent, real-time collaboration environment in which any type of data can be shared in a common work space. In this invention, users connected to the system and engaged in a collaborative session share a common work space that is presented via each user's computer connected through a network. The data in the shared work space can be anything; e.g., a spreadsheet, an image, a simple text file, a text document, a drawing, a project schedule, a three-dimensional view, or any custom data. The work space for each participant is kept synchronized with everyone else. This can be done either through peer to peer messaging between the clients or through one or more servers.

In most cases, all synchronized applications will present the same display to each client as in FIG. 1. However, we can have synchronized applications in which the displays at different clients may be syntactically different, even though the underlying data is the same. This would be useful when the hardware for clients are not the same, or when some information needs to be deliberately suppressed or added or shown in a different format on different clients.

A participant in a collaborative session will be engaged at any time in one of multiple distinct modes of activity as related to the shared work space. In one mode, a user will be engaged in discussing the shared work space data with others. This will involve viewing different parts of the work space, pointing to some part of the work space, marking over a portion using a pen or some other drawing tool, or writing some annotating text over some portion of the work space. In another mode, a user will be actually editing the data inside the shared work space. For example, if it is a spreadsheet, he or she may want to change a cell entry; if it is a three dimensional view of a room, he or she may want to move a chair to a different location. The mode of editing the work space is data specific; that is, it is handled by the appropriate application itself. The mode of discussing the work space can be accomplished in a common way independent of the underlying data or the application.

Figure 2:
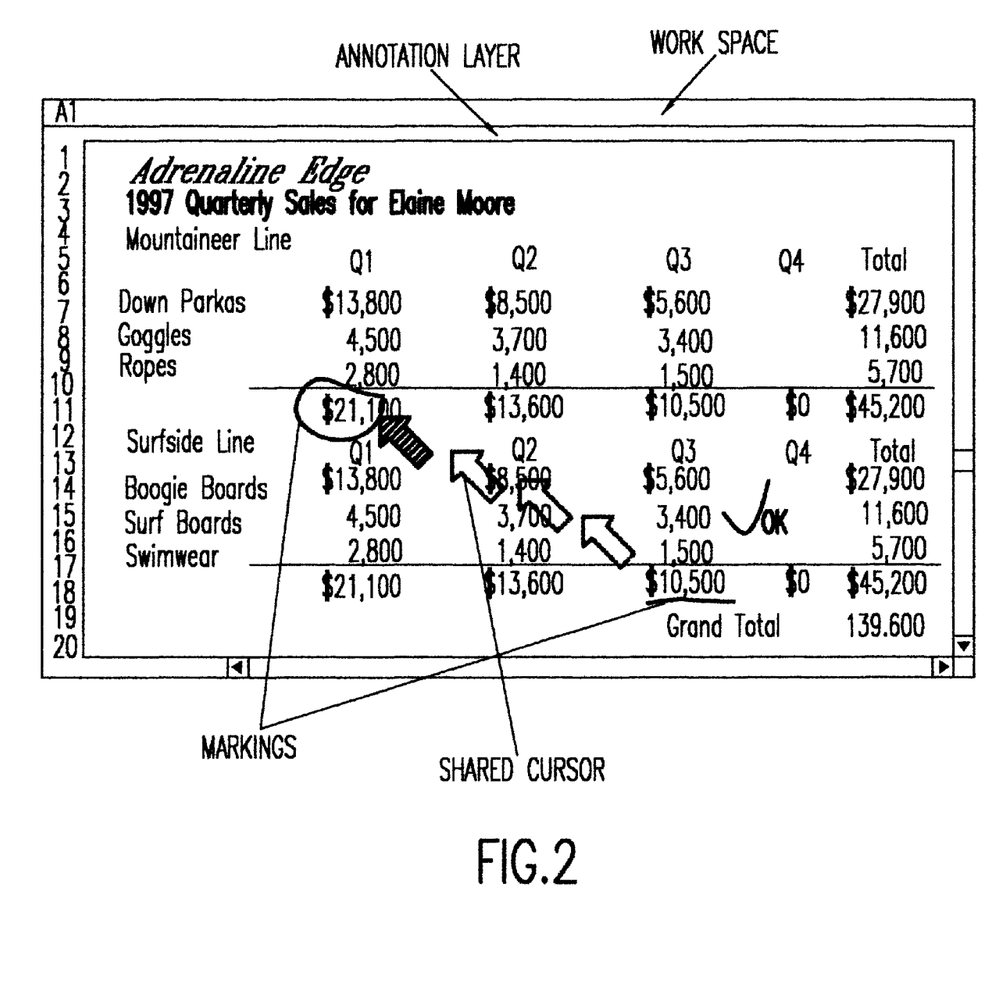
FIG. 2 is an illustration of the annotation layer according to the invention in which a transparent whiteboard-like layer covers the shared work space and on which annotation, shared cursor(s) motion and other markings can be made.

As shown in FIG. 2, the invention uses an annotation layer for handling the discussion mode on top of any synchronized work space. The annotation layer appears as a transparent graphical object that covers the shared window displaying the synchronized application and the shared data. During the discussion mode, it appears to the user as if the application is covered by this transparent layer, and any mouse, keyboard or other input is caught by this layer. The annotation layer appears to handle each user input such as mouse and keyboard events to generate appropriate action such as moving a cursor, selecting a drawing tool and marking over an area or placing annotation text. All the annotation effects appear on the annotation layer itself, independent of the application underneath.

In order to change the underlying shared data, a user has to be in the edit mode. The edit mode can be entered by the pressing of an appropriate icon, button or a graphical object or by giving some predefined input such as a combination of keystrokes. After entering the edit mode, the user's input is handled directly by the application itself. For instance, if the shared data is a spreadsheet, the user, upon entering the edit mode, will start using the spreadsheet application that was underneath the annotation layer. The applications, of course, will be synchronized among all clients either through replication of user input or by other means, so that when a user edits the data on one client, all the clients will display the changed data. The annotation layer can be still present and display the markings left by various users, but to the user in the edit mode, it will appear to be dormant.

Figure 3A:
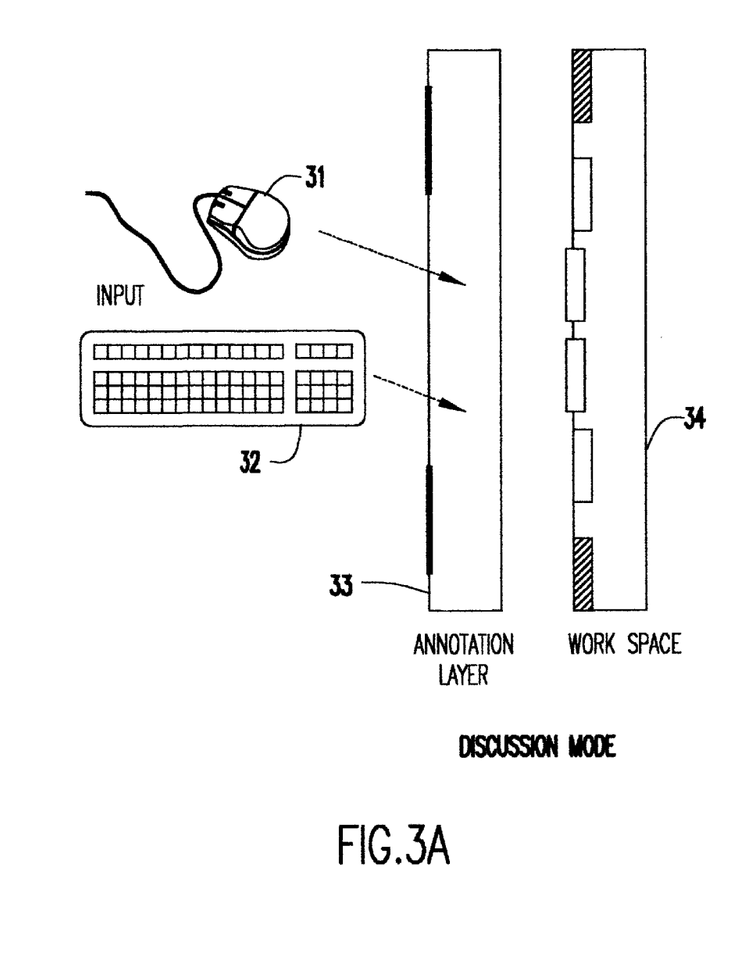
FIGS. 3A and 3B are, respectively, illustrations of the operations of the annotation layer in the discussion mode and the edit mode during a collaboration session according to the invention.
Figure 3B:
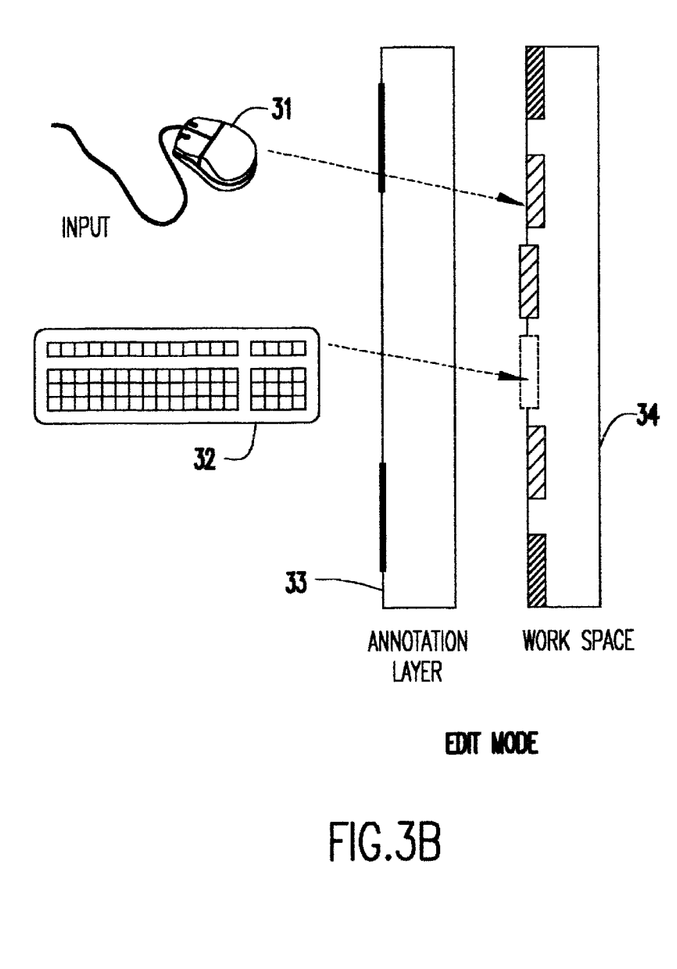

This type of mode switching behavior is illustrated in FIGS. 3A and 3B. FIG. 3A illustrates the discussion mode in which a user's input from, say, a mouse 31 and a keyboard 32 are captured and displayed on the transparent annotation layer 33. The underlying application 34 is not affected by the cursor movements and annotations input by the several users. The annotation layer 33 itself is synchronized with the work space underneath, so that the markings change appropriately when the application display is moved, resized or when the display inside is scrolled. FIG. 3B illustrates the edit mode in which the user inputs from the mouse 31 and the keyboard 32 are passed directly to the underlying work space 34 to edit the data.

The annotation layer and its behavior as described are simply a user interface characteristic of the real time collaborative environment. The actual implementation can be achieved in many different ways. The annotation layer can be a real graphical object in the windowing system used by the clients. For example, if all applications are Java Applets, the annotation layer can be a lightweight component that covers the applet. Or the annotation layer can be integrated into each application itself, with each application handling the discussion and edit modes appropriately and generating the markings as needed inside its own window. Another implementation could use the operating system itself, or different implementations could be combined.

The fall user interface disclosed herein can be built into any real-time collaboration system. Any real-time collaboration system can be viewed as comprising the following elements:

1. A means for generating a set of front end processes (clients) for any session of real-time collaboration supported by the system. In any such session, the session's clients provide synchronous access to the session's shared work space to the participants of the session. The client processes can rely on the single-user, non-collaborative, software application that is ordinarily used to access the work space in a sequential, isolated, non-collaborative manner. Each client can be capable of supporting one or more different kinds of work spaces. The real-time collaboration system can be capable of generating more than one kind of client. Thus, the set of work space kinds supported by the collaboration system is the union of the sets of work space kinds supported by all the different kinds of clients generated by the system.

2. A means for generating a serializing mechanism for any real-time collaboration session supported by the system. From each client of any such collaboration session, the session's serializing mechanism takes as input a sequence of work space modifications generated by the client. To all clients in the collaboration session, the serializing mechanism makes available one stream of serialized work space modifications based on the input modification sequences received from the clients. The serialized modification stream comprises an interleaving of the sequences of modifications sent by the clients. The serializing mechanism can be server based, such as a centralized server, or it can be based on peer-to-peer messaging.

3. A means for generating the communication mechanism for any real-time collaboration session supported by the system. For any such session, each client in the session is provided with a means for communicating a sequence of modifications to the serializing mechanism of the session. The client is also provided with means for receiving serialized modifications from the serializing mechanism. Any client as described in element 1 above can support the formation of a modification by any participant using the client. The modification formation occurs in the context of a work space state that can change while the modification is being formed. This can happen due to the arrival of a serialized modification. The client presents a reasonably up-to-date view of the work space to the participant based on the serialized modifications received by the client. In modification formation, the client can let the participant see the potential effect of his or her modification on the work space while the modification is in formation. The effect may not be the effect that is finally generated by the modification because unseen serialized modifications can end up preceding the modification in the serialized stream of modifications.

The invention disclosed herein, the user interface, is based on a transparent annotation layer. The annotation layer is a bitmap-like or whiteboard-like work space under which other work spaces can be placed. The annotation layer is transparent, so the work space under the whiteboard-like layer can also be seen. The annotation layer is whiteboard-like since it supports a very large set of markings which may seem like bit-by-bit or pixel-by-pixel markings. The annotation layer is not simply a whiteboard since, for efficiency reasons, there is no need to incur the cost of individual bit or pixel settings. Regardless, for the purpose of the discussion here, it is simpler and sufficient to treat the annotation layer as simply a kind of a whiteboard. Thus, for the annotation layer, the technology of a real-time collaboration system specific to whiteboard work spaces is available straightforwardly. This technology has the attributes of a real-time collaboration system as described in the preceding.

The annotation layer based user interface includes components that are discussed in the following under separate headings. The components are instantiated in each client generated by any real-time collaboration system that has been augmented by the annotation layer based user interface.

A Live Annotation Layer

Consider a real-time collaboration system specific to whiteboard-like work spaces, viz. annotation layer work spaces. Consider a pared version of such a real-time collaboration system wherein only the client portion of the system is retained and the serialization mechanism and the communication mechanism for the serializing mechanism are removed. The client functionality, namely a live annotation layer, provided by such a pared system is made available to clients using the annotation layer based user interface. The live annotation layer gets two input streams concurrently: (a) a stream of user input segments, and (b) a stream of serialized modifications and updates. From either stream, the annotation layer processes input one entity at a time. Since the streams are concurrent, the annotation layer can end up processing several entities from one stream while simultaneously processing one entity from the other stream. User input stream is segmented. One entity from the stream comprises one segment of user input. One segment of user input is one contiguous stretch of input sent by a participant to the annotation layer; e.g., keyboard input interspersed with mouse events. For a segment of user input, the annotation layer is responsible for returning a sequence of annotation layer modifications representing that input. In the process of forming these modifications, the annotation layer can show the potential effect of the modifications on the display for the transparent annotation layer.

As is usual in real-time collaboration systems, the annotation layer has to present a reasonably up-to-date state of the work space that is the annotation layer by incorporating serialized modifications and updates received for the layer. The stream of serialized modifications and updates provides either one serialized modification or one serialized update to the annotation layer at one time. Serialized modifications represent serialized input that is directed at the annotation layer by participants of the real-time collaboration. Serialized updates represent the effect on the annotation layer of the serialized input that is directed at the work space of the real-time collaboration session; i.e., the work space that is presented underneath the transparent annotation layer. At any time, none or one of the following is in the act of being processed: (a) a serialized modification directed to the annotation layer, (b) a serialized modification directed to the work space of the real-time collaboration session. The processing of a modification for one layer (annotation layer or work space layer) can generate an update for the other layer which is presented to the other layer immediately; e.g., by being placed at the front of the stream of serialized modifications and updates for the layer. Only when the modification and any update engendered by it are processed fully is the next serialized modification made available for processing. Thus, when the annotation layer gets a serialized modification for processing, it can end up creating a serialized update for the work space layer. It waits for the complete processing of the serialized modification and for getting an acknowledgment of the complete processing of the update before acknowledging that processing of the serialized modification has been completed.

A serialized modification in the annotation layer is allowed to engender only display-changing updates such as scrolling and resizing for the work space layer. Thus, deleting a portion of the annotation layer does not delete the corresponding portion of the work space. This restriction bounds collaboration in the annotation layer to a desirable, read-only capacity as far as the work space is concerned. It is straightforward to relax this restriction; however, this is not desirable. Update for the work space layer can be made by comparing a bitmap or other image of the work space display with a bitmap or other image of the annotation layer before and after the serialized modification. The comparison can lead to the generation of commands that comprise the update that realigns the work space and the annotation layer.

Figure 4:
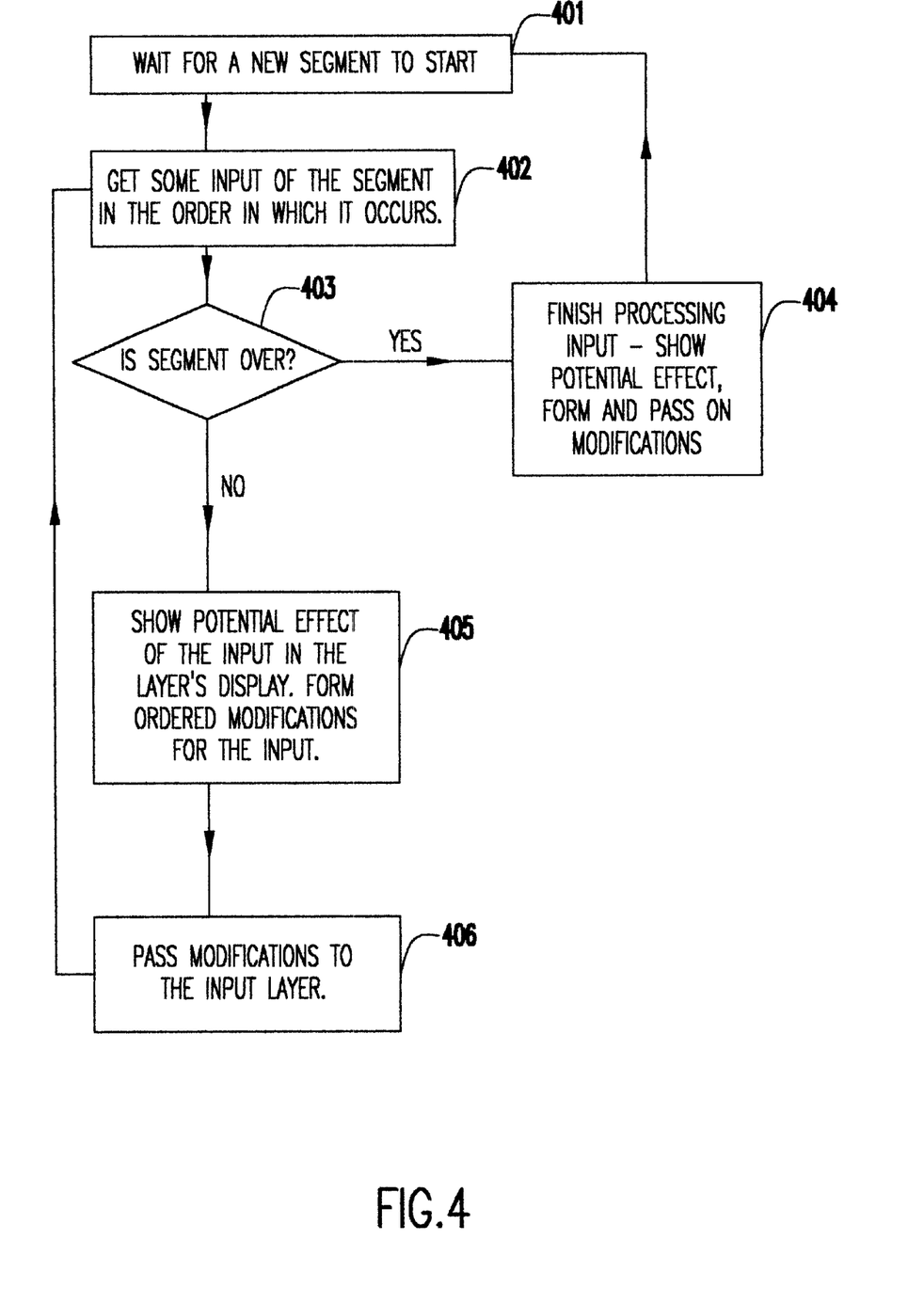
FIG. 4 is a flow diagram showing the logic of processing user input in an implementation of the annotation layer according to the invention.

FIG. 4 illustrates the logic of processing the user input for the annotation layer. The process is similar for the work space layer. The process begins in function block 401 which waits for a new segment to start. When a new segment starts, some input of the segment is gotten in the order in which it occurs in function block 402. A test is then made in decision block 403 to determine if the segment is over. If so, the input is processed, showing its potential effect on the annotation layer's display in function block 404. Modifications are formed and passed on to the input layer before the process loops back to function block 401 to wait again for a new segment to start. If the segment is not over, as determined in decision block 403, then the potential effect is shown in the annotation layer's display in function block 405. Ordered modifications for the input are formed, and then the modifications are passed to the input layer in function block 406. The process then loops back to function block 402 to get more input of the segment.

Figure 5:
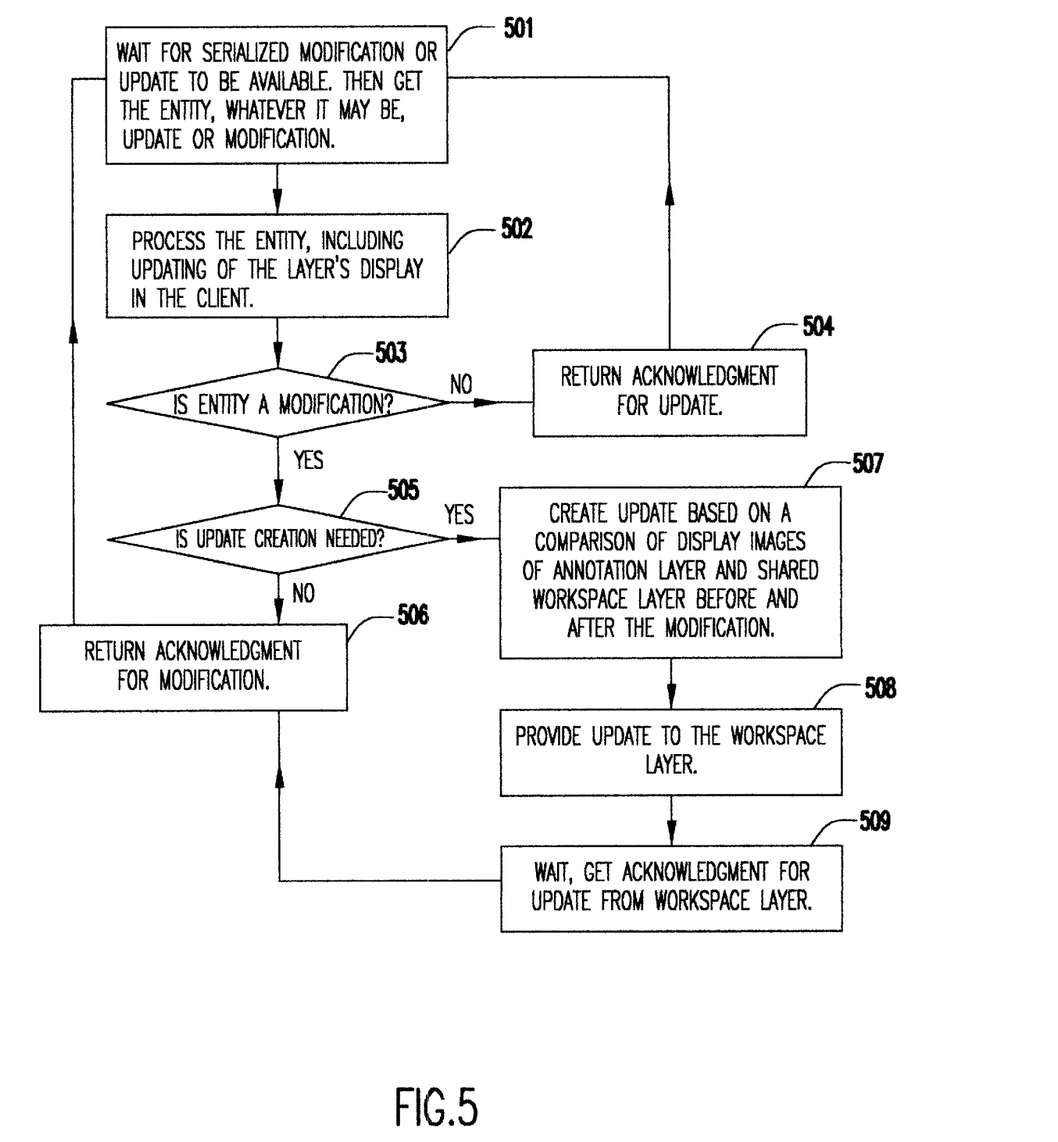
FIG. 5 is a flow diagram showing the logic of processing serialized modifications and updates in an implementation of the annotation layer according to the invention.

The process shown in FIG. 4 occurs in concurrence with the process of FIG. 5 which shows the processing of serialized modifications and updates in the annotation layer. The process is similar for the work space layer. The process begins in function block 501 which waits for a serialized modification or update to be available. When available, the entity, whatever it might be (update or modification), is gotten. Next, the entity is processed in function block 502. This processing includes updating of the annotation layer's display in the client. A test is made in decision block 503 to determine if the entity is a modification. If not, an acknowledgment is returned for update in function block 504, and the process loops back to function block 501 to wait again for a serialized modification or update to be available. If the entity is a modification, as determined in decision block 503, a further test is made in decision block 505 to determine if an update creation is needed. If not, an acknowledgment is returned for the modification in function block 506, and the process loops back to function block 501 to wait again for a serialized modification or update to be available. If an update creation is needed as determined in decision block 505, then the update is created in function block 507 based on a comparison of display images of the annotation layer and shared work space layer before and after modification. The update is provided to the work space layer in function block 508, then process waits to get an acknowledgment of full processing of the update from the work space layer in function block 509. When the acknowledgment is received, an acknowledgment is returned for the modification in function block 506, and the process loops back to function block 501 to wait again for a serialized modification or update to be available.

A Live Work Space Layer

A work space layer exists concurrently with the annotation layer and in a manner that is analogous to the annotation layer. See again FIGS. 4 and 5. The work space layer gets inputs in a manner that is similar to the annotation layer and responds similarly. The major difference in the work space layer and the annotation layer is that the work space layer can create updates for the annotation layer that delete or copy portions of the annotation layer besides simply changing the display of the annotation layer. There is no read-only bound that is enforced over work space collaboration from the perspective of the annotation layer.

An Input Layer

An input layer exists concurrently with other layers and captures and segments all user input. All input (keyboard, mouse, and other input devices such as pen) to any client is first caught by this layer in the client. Each client at any time has a mode associated with it. The client's mode describes the recipient of the user input viz. the annotation layer, the work space layer, and the input layer itself. The client's mode can be changed by the user input, in which case, the input is identified with the changed mode. Mode can be changed independently and concurrently by the serialized modifications received by the client. User input is segmented by the input layer such that each segment contains a longest stretch of contiguous user input during which the mode does not change. Each input segment is made available to the appropriate recipient while the segment is in formation. Thus, input directed to the annotation layer is made available immediately to the annotation layer. The mode for this is discussion mode.

In edit mode, input is directed to the work space layer. The input layer has a display bar which shows the status of the collaboration session including modes of the individual clients. The display bar also shows controls (icons, buttons, etc.) and menus for mode and collaboration control. Clicking on control options can change the mode to a control mode which besides allowing for control of the client's own mode, can allow for the control of modes of other clients. Mode change can also be effected by other combinations of user input such as keyboard input. Not all control and mode options may be available to a participant at a time because of the decisions of other participants (communicated to the participant's client through serialized control modifications).

Figure 6A:
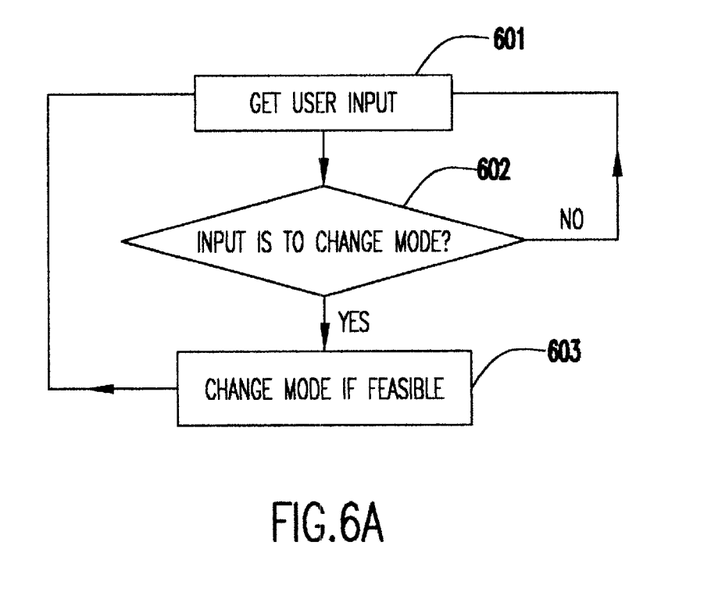
FIGS. 6A and 6B are, respectively, flow diagrams showing the logic of processing a change in mode based on user input and processing a change in mode based on serialized control modifications in an implementation of the input layer according to the invention.

The process for changing mode based on user input is shown in FIG. 6A. The process begins in function block 601 where the user input is gotten. A test is made in decision block 602 to determine if this input is to change mode. If not, the process loops back to function block 601 to await the next user input. If the user input is to change mode as determined by the test in decision block 602, then the mode is changed if feasible in function block 603, and the process loops back to function block 601 to await the next user input.

Figure 6B:
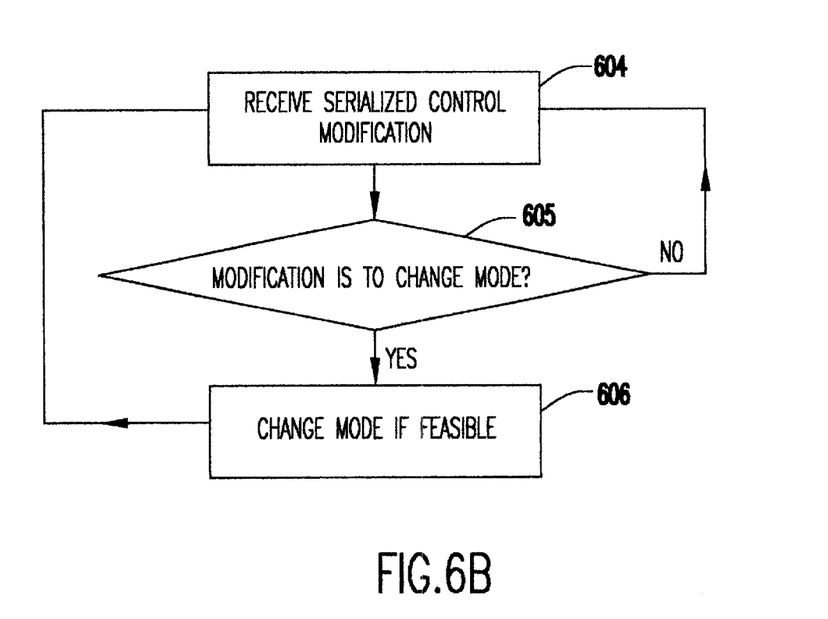

The input layer also receives as input, serialized modifications for mode and collaboration control. The input layer receives and processes these control modifications in concurrence with the handling of the user input (see FIG. 6A). The process is shown in FIG. 6B. The process begins in function block 604 where a serialized control modification is received. A test is then made in decision block 605 to determine if the modification is to change mode. If not, the process loops back to function block 604 to await the next serialized control modification. If the modification is to change mode as determined by the test in decision block 605, then the mode is changed in function block 606 if feasible, and the process loops back to function block 604 to await the next serialized control modification. Feasibility of mode change in the processes of FIGS. 6A and 6B depends on whether mode change has been disabled previously by control modifications or not.

The control modifications can change the available options on the display bar of the input layer. The control modifications can change and/or restrict the modes available to any client. The authority to make and send such control modifications may be vested in a subset of collaboration participants. Control modifications also include modifications that change the set of participants with such authority. For every segment of user input, the input layer receives a sequence of modifications from the recipient layer of the input. The input layer tags the modifications by their mode (e.g., annotation layer modifications by discussion, input layer related modifications by control) and then sends the modifications in sequence order over a communication means to the serializing mechanism for the collaboration session. The communication means and the serializing mechanism can be an adaption generated from the unaugmented (by annotation layer based user interface) portion of the augmented real-time collaboration system, or it can be provided for separately in the augmented real-time collaboration system.

Figure 7A:
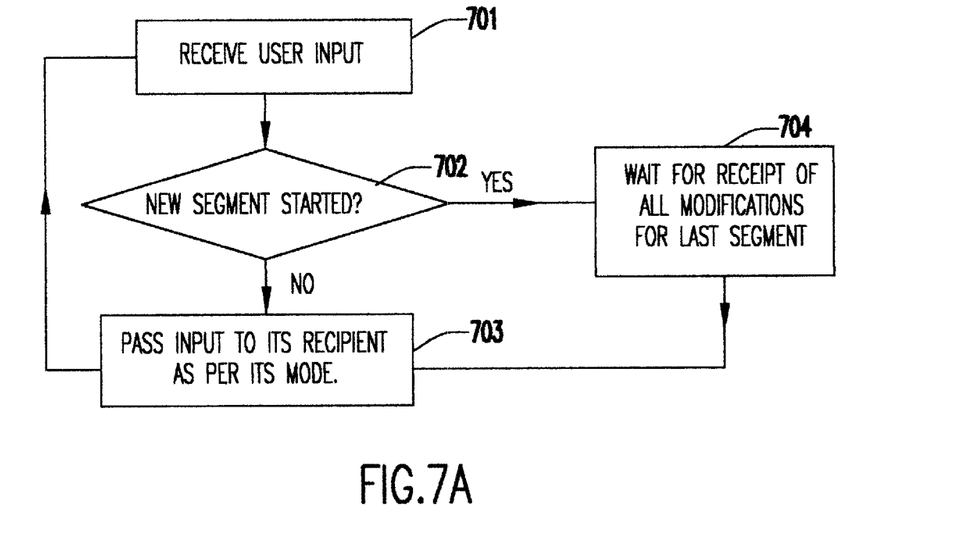
FIGS. 7A and 7B are, respectively, flow diagrams showing the logic of processing the directing of user input segments to recipients and processing modifications corresponding to user input in an implementation of the input layer according to the invention.
Figure 7B:
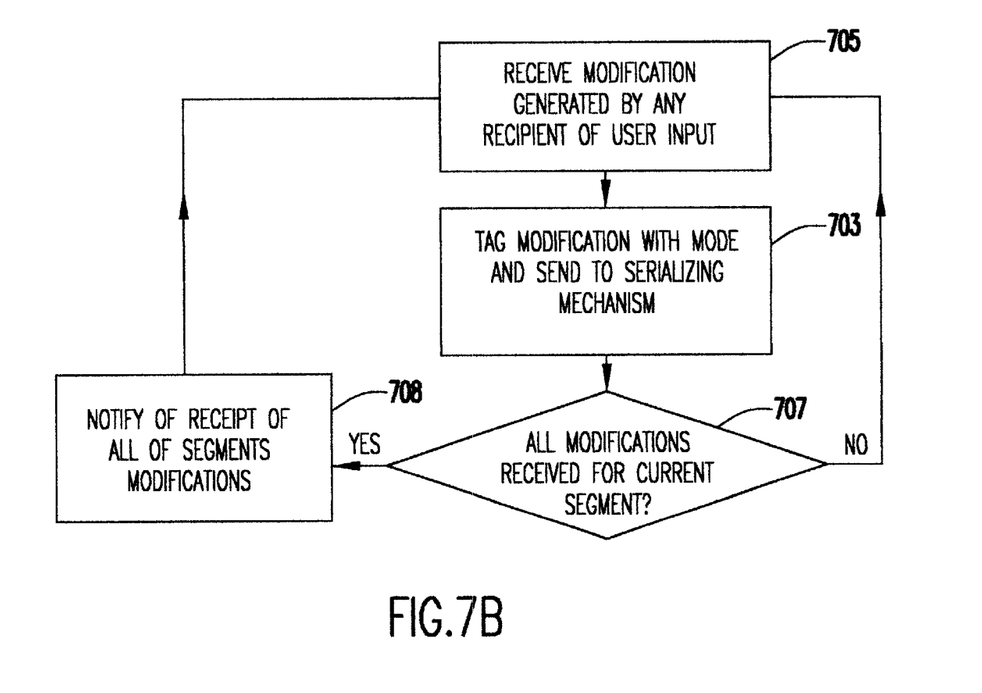

The input layer process for directing user input segments to recipients is shown in FIG. 7A, and the input layer processing modifications corresponding to user input is shown in FIG. 7B. The two processes of FIGS. 7A and 7B exist in concurrence with themselves and the concurrent processes of FIGS. 6A and 6B.

Referring first to FIG. 7A, the process begins by receiving the user input in function block 701. A test is made in decision block 702 to determine if a new segment has started. If not, the user input is passed to its recipient depending on the mode for the input in function block 703, and the process loops back to function block 701 to await the next user input. If a new segment has started as determined by the test in decision block 702, then the process waits for the receipt of all modifications for the last segment in function block 704 before passing the input to its recipient in function block 703.

The process shown in FIG. 7B begins in function block 705 where the modification generated by any recipient of user input is received. The modification is tagged with its associated mode and sent to the serializing mechanism in function block 706. A test is then made in decision block 707 to determine if all modifications have been received for the current segment. If not, the process loops back to function block 705 to continue processing of the current segment; otherwise, a notification of receipt of all of the segment's modifications is made in function block 708 before the process loops back to function block 705.

A Back-end

The back-end receives serialized mode-tagged modifications from the serializing mechanism and passes them in receipt order to the appropriate layer in the client (as per the tagging mode). The back-end passes a serialized modification to a layer only upon getting an acknowledgment that the serialized modification that preceded this modification has been processed fully.

The annotation layer based user interface can be built into any real-time collaboration system as follows. The annotation layer can be based on usual whiteboard technology with adjustment made for transparency and the processes described above. The work space layer can straightforwardly rely on a connection to the client mechanism of the unaugmented real-time collaboration system. The input layer and the back-end can straightforwardly rely on the support for communication means and serializing mechanism provided in the unaugmented real-time collaboration system. Otherwise, they can use the usual technology available for such support. The processes specific to the annotation layer, work space layer, input layer and back-end as described above can either be individually implemented for a specific augmentation of a real-time collaboration system, or they can be made available as say a software library that can be used repeatedly for augmenting many real-time collaboration systems.

In summary, the annotation layer based user interface according to the invention provides for the standardized viewing, discussion, marking, and expert modification of all kinds of work spaces in real-time collaboration. The interface can be built into any real-time collaboration system without affecting the set of work spaces that the system can support. The interface provides a transparent wrapper, an annotation layer, through which participants view their work space. Participants can mark the work space by marking the wrapper without modifying the work space itself. Modifying the work space may require work space specific expertise on the part of the participants, which can thus be avoided by some or all of the participants. Markings allowed on the wrapper can be more extensive than what are possible within the work space itself. The annotation layer can be synchronized or unsynchronized with the work space underneath. Scrolling a synchronized work space also scrolls the annotation layer and vice versa, etc. Each participant can work with the annotation layer or the work space, depending on the choice of his or her mode. The choice may be the participant's alone, or it may depend on other participants. Control of a participant's mode is also control over the participant's read/write permissions for the work space. The authority to control other participants' modes may be changed during the collaboration session.

While the invention has been described in terms of a single preferred embodiment, those skilled in the art will-recognize that the invention can be practiced with modification within the spirit and scope of the appended claims.

Having thus described our invention, what we claim as new and desire to secure by Letters Patent is as follows:

1. A work space independent user interface for a real-time collaboration system implemented on computers connected in a network, the real-time collaboration system augmented with the user interface continues to support every work space that it could previously support, the user interface comprising:

a shared transparent annotation layer built in the real-time collaboration system, the shared transparent annotation layer being placed between each participant and a shared work space, the shared transparent annotation layer overlying the work space so that each participant can view the work space through the shared transparent annotation layer;

means for choosing and changing a mode of operation during a collaborative session between a discussion mode and an edit mode, wherein in the discussion mode only the annotation layer is directly manipulated and/or modified and wherein in the edit mode only the work space is directly manipulated and/or modified, the shared transparent annotation layer in the discussion mode providing to the collaboration session a convenience of variously viewing and discussing the work space by participants of the collaboration session, including marking the shared transparent annotation layer in different ways without actually modifying the work space itself, the marking of the shared transparent annotation layer not being limited to markings supported by the work space itself; and means for supporting enforcement of synchrony between any work space and the work space's covering transparent annotation layer wherein, for any work space, when the work space and its covering transparent annotation layer are synchronized, scrolling the work space also scrolls the transparent annotation layer and vice versa, expanding the work space by adding data to the work space also expands the transparent annotation layer in corresponding regions, and contracting the work space by deleting data from it also contracts the transparent annotation layer by truncating corresponding regions.

2. The user interface of claim 1, wherein the user interface provides a standardized way of viewing, discussing, marking, and expertly modifying any work space in a real-time collaboration, allowing a participant to easily direct and/or participate in any real-time collaboration session without having expert knowledge of how to manipulate and/or modify a session specific shared work space while still allowing a participant with expert knowledge to continue to manipulate and/or modify the session specific shared work space.

3. The user interface of claim 1, wherein synchrony between any work space and its covering transparent annotation layer is based on a comparison of images of the work space and the transparent annotation layer.

4. The user interface of claim 1, wherein in the discussion mode, the work space underneath the transparent annotation layer optionally remains visible, and wherein in the edit mode, the transparent annotation layer overlying the work space optionally remains visible.

5. The user interface of claim 1, wherein the means for choosing and changing mode supports the specification of choice and change of mode by any participant.

6. The user interface of claim 1, wherein the means for choosing and changing mode supports the control of mode of some participants by other participants.

7. The user interface of claim 6, wherein the means for choosing and changing mode allows participants to change the mode and restrict a set of modes available to other participants.

8. The user interface of claim 1, wherein the means for choosing and changing mode supports changing a set of participants with authorization to control the mode of other participants.

9. The user interface of claim 8, wherein control of the mode of a participant controls read/write permission of the participant, any participant who has been granted edit mode can write to the work space while any participant who has been restricted to the discussion mode can at most only read the work space.

10. The user interface of claim 1, wherein the transparent annotation layer is based on a client portion of a real-time collaboration system for whiteboard-like work spaces.

11. A work space independent user interface for a real-time collaboration system implemented on computers connected in a network, the real-time collaboration system augmented with the user interface continues to support every work space that it could previously support, the user interface comprising:

a shared transparent annotation layer built in the real-time collaboration system, the shared transparent annotation layer being placed between each participant and a shared work space, the shared transparent annotation layer overlying the work space so that each participant can view the work space through the shared transparent annotation layer;

means for choosing and changing a mode of operation during a collaborative session between a discussion mode and an edit mode, wherein in the discussion mode only the annotation layer is directly manipulated and/or modified and wherein in the edit mode only the work space is directly manipulated and/or modified, the shared transparent annotation layer in the discussion mode providing to the collaboration session a convenience of variously viewing and discussing the work space by participants of the collaboration session, including marking the shared transparent annotation layer in different ways without actually modifying the work space itself, the marking of the shared transparent annotation layer not being limited to markings supported by the work space itself; and means for supporting enforcement of asynchrony between any work space and the work space's covering transparent annotation layer, wherein for any work space, when the work space and its covering transparent annotation layer are left unsynchronized, scrolling the work space does not scroll the annotation layer, scrolling the annotation layer does not scroll the work space, and modifying the work space does not correspondingly modify the annotation layer.

12. The user interface of claim 11, wherein asynchrony between a work space and its covering transparent annotation layer allows the transparent annotation layer to serve as a static filter through which the entire work space or a portion of the work space can be seen.

13. A method of augmenting a real-time collaboration system implemented on computers connected in a network, comprising:

providing as a user interface a shared transparent annotation layer built in the real-time collaboration system, the shared transparent annotation layer being placed between each participant and a shared work space, the shared transparent annotation layer overlying the work space so that each participant can view the work space through the shared transparent annotation layer, the real-time collaboration system augmented with the user interface continuing to support every work space that it could previously support, the shared transparent annotation layer providing to the collaboration session a convenience of variously viewing and discussing the work space by participants of the collaboration session, including marking the shared transparent annotation layer in different ways without actually modifying the work space itself; and supporting enforcement of synchrony between any work space and the work space's covering transparent annotation layer wherein, for any work space, when the work space and its covering transparent annotation layer are synchronized, scrolling the work space also scrolls the transparent annotation layer and vice versa, expanding the work space by adding data to the work space also expands the transparent annotation layer in corresponding regions, and contracting the work space by deleting data from it also contracts the transparent annotation layer by truncating corresponding regions.

14. The method of augmenting a real-time collaboration system of claim 13, wherein the user interface provides a standardized way of viewing, discussing, marking, and expertly modifying any work space in a real-time collaboration, allowing a participant to easily direct and/or participate in any real-time collaboration session without having expert knowledge of how to manipulate and/or modify a session specific shared work space while still allowing a participant with expert knowledge to continue to manipulate and/or modify the session specific shared work space.

15. The method of augmenting a real-time collaboration system of claim 13, further comprising the step of providing participants an option of choosing and changing a mode of operation during a collaborative session between a discussion mode and an edit mode, in the discussion mode only the annotation layer is directly manipulated and/or modified while in the edit mode, only the work space is directly manipulated and/or modified.

16. The method of augmenting a real-time collaboration system of claim 15, wherein the step of providing participants the option of choosing and changing mode supports the specification of choice and change of mode by any participant.

17. The method of augmenting a real-time collaboration system of claim 15, wherein the step of providing participants the option of choosing and changing mode supports the control of mode of some participants by other participants.

18. The method of augmenting a real-time collaboration system of claim 17, wherein the step of providing participants the option of choosing and changing mode allows participants to change the mode and restrict a set of modes available to other participants.

19. The method of augmenting a real-time collaboration system of claim 15, wherein the step of providing participants the option of choosing and changing mode supports changing a set of participants with authorization to control the mode of other participants.

20. The method of augmenting a real-time collaboration system of claim 19, wherein controlling the mode of a participant controls read/write permission of the participant, any participant who has been granted edit mode can write to the work space while any participant who has been restricted to the discussion mode can at most only read the work space.

21. The method of augmenting a real-time collaboration system of claim 13, wherein in the discussion mode, the work space underneath the transparent annotation layer optionally remains visible, and wherein in the edit mode, the transparent annotation layer overlying the work space optionally remains visible.

22. The method of augmenting a real-time collaboration system of claim 13, wherein synchrony between any work space and its covering transparent annotation layer is based on a comparison of images of the work space and the transparent annotation layer.

23. The method of augmenting a real-time collaboration system of claim 13, wherein the transparent annotation layer is based on a client portion of a real-time collaboration system for whiteboard-like work spaces.

24. A method of augmenting a real-time collaboration system implemented on computers connected in a network, comprising:

providing as a user interface a shared transparent annotation layer built in the real-time collaboration system, the shared transparent annotation layer being placed between each participant and a shared work space, the shared transparent annotation layer overlying the work space so that each participant can view the work space through the shared transparent annotation layer, the real-time collaboration system augmented with the user interface continuing to support every work space that it could previously support, the shared transparent annotation layer providing to the collaboration session a convenience of variously viewing and discussing the work space by participants of the collaboration session, including marking the shared transparent annotation layer in different ways without actually modifying the work space itself; and supporting enforcement of asynchrony between any work space and the work space's covering transparent annotation layer, wherein for any work space, when the work space and its covering transparent annotation layer are left unsynchronized, scrolling the work space does not scroll the annotation layer, scrolling the annotation layer does not scroll the work space, and modifying the work space does not correspondingly modify the annotation layer.

25. The method of augmenting a real-time collaboration system of claim 24, wherein asynchrony between a work space and its covering transparent annotation layer allows the transparent annotation layer to serve as a static filter through which the entire work space or a portion of the work space can be seen.

26. A graphical user interface implemented on a first computer connected, via a network, to a second computer within a collaboration system, comprising:

an annotation layer overlying a work space, said annotation layer being at least partially transparent to allow viewing of at least a portion of the work space;

control means for switching between a discussion mode and an edit mode, wherein in the discussion mode only the annotation layer is modified with input data and in the edit mode only the work space is modified with input data;

means for synchronizing said annotation layer to said work space; and means for sending said input data entered by a user at said first computer in at least said discussion mode to said second computer, and for receiving input data entered by a user at said second computer in at least said discussion mode, said sending and receiving means allowing at least said annotation layer to be shared between said first and second computers in real-time.

27. The graphical user interface of claim 26, wherein said synchronizing means performs at least one of the following: coordinates scrolling said work space with said annotation layer, coordinates expanding said work space to receive data additions with expansion of said annotation layer, and coordinates contracting said work space by deleting data with contractions of said transparent annotation layer.

\* \* \* \* \*